Patented July 11, 1933

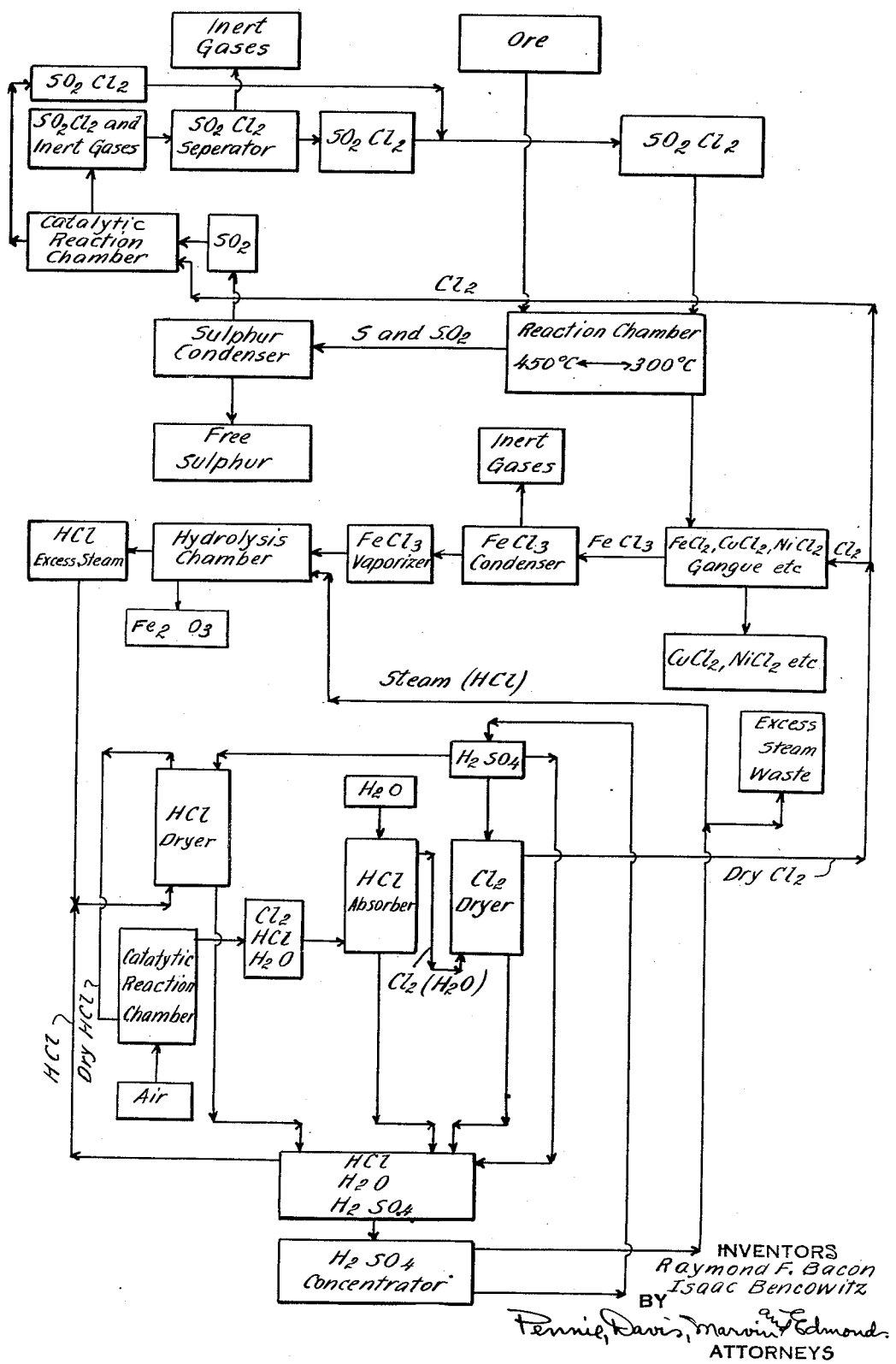

1,917,224

UNITED STATES PATENT OFFICE

RAYMOND F. BACON, OF BRONXVILLE, AND ISAAC BENCOWITZ, OF NEW YORK, N. Y.; SAID BENCOWITZ ASSIGNOR TO SAID BACON

RECOVERY OF SULPHUR

Application filed February 26, 1930. Serial No. 431,461.

This invention relates to the recovery of sulphur and has for an object the provision of an improved process for recovering sulphur from heavy metal sulphide ores. More particularly, the invention contemplates the provision of an improved process for recovering sulphur from materials containing one or more sulphides of iron. The invention further contemplates the provision of an improved process for treating heavy metal sulphide ores such, for example, as ore containing sulphides of iron, copper and nickel.

The process of the present invention involves the treatment of ore or other metallurgical raw materials or products containing pyrites or other sulphides of iron, alone or in combination with sulphides of other heavy metals such, for example, as copper and nickel with sulphuryl chloride for the purpose of obtaining free sulphur and/or separating iron from the mass of material undergoing treatment.

In carrying out a process in accordance with the present invention, a quantity of the iron sulphide-bearing material to be treated is subjected to the action of sulphuryl chloride under such conditions that ferrous chloride and free sulphur are formed. The process is so conducted that the sulphur produced is vaporized, leaving a residue containing the ferrous chloride together with chlorides of other heavy metals such as copper and nickel when the sulphides of such metals are present in the material being treated. The residue containing ferrous chloride is subjected to the action of chlorine gas to produce ferric chloride. The ferric chloride is treated to recover chlorine.

During the course of the reaction between the sulphuryl chloride and the sulphides contained in the material being treated, sulphur dioxide gas is formed and passes out of the reaction chamber with the vaporized sulphur. The recovered chlorine is combined with the sulphur dioxide produced to regenerate sulphuryl chloride which is returned to the process.

The invention will be better understood from a consideration of the accompanying flowsheet and the following description of the application of the process to the treatment of ore containing pyrites and sulphides of copper and nickel.

The ore to be treated is subjected to the action of sulphuryl chloride in a reaction chamber under such conditions that ferrous chloride and free sulphur are produced. The operation is so conducted that the sulphur produced is vaporized, leaving a residue containing the ferrous chloride together with the chlorides of copper and nickel. Sulphur dioxide is formed during the course of the reaction and passes from the reaction chamber with the vaporized sulphur. A temperature below the boiling point of sulphur may be maintained in the reaction chamber and the sulphur may be swept from the reaction chamber by means of inert gases introduced with the sulphuryl chloride and/or the sulphur dioxide produced, or a temperature sufficiently high to vaporize the sulphur may be maintained and substantially pure sulphuryl chloride may be employed.

The ore is preferably introduced in a dry, finely divided condition into the interior of a rotary reaction chamber having ore charging means at one end and discharging means at the other end, and which is so constructed and operated that the ore is gradually moved from the charging end toward the discharge end. Sulphuryl chloride is introduced into the reaction chamber at the end opposite to that at which the ore is introduced and the ore and sulphuryl chloride pass through the reaction chamber in counter-current relationship, the vaporized sulphur being removed from the reaction chamber at a point near the charging end. Sulphuryl chloride may be introduced into the reaction chamber as a liquid or as a gas. Liquid sulphuryl chloride will be vaporized immediately after its introduction. The ore is preferably ground to provide particles sufficiently small to pass a 100-mesh screen in order that intimate contact of the sulphuryl chloride with the sulphide particles may be obtained.

The reaction between the sulphuryl chloride and heavy metal sulphides starts at a temperature of about 250° C. and proceeds most rapidly at a temperature of about 500° 100

C. It is, therefore, advisable to maintain a temperature of about 500° C. in at least a portion of the reaction chamber. Such a temperature may be maintained in the ore charging end portion of the reaction chamber to insure the passage of all issuing gases through a zone in which conditions are conducive to a complete reaction.

The process is preferably so controlled that a temperature of about 500° C. is maintained near the ore charging end of the reaction chamber, and a temperature of about 250° C. to 350° C. is maintained near the ore discharge end of the reaction chamber. The sulphuryl chloride in any desired concentration and at any desired temperature is introduced into a portion of the reaction chamber which is maintained at a temperature of about 250° C. to 350° C. The sulphuryl chloride and the metal sulphides react to produce elemental sulphur, sulphur dioxide, ferrous chloride and the chlorides of copper and nickel. The admission of ore and sulphuryl chloride is preferably so regulated that all of the sulphur liberated is vaporized as elemental sulphur, all of the sulphuryl chloride admitted is consumed, and substantially all of the iron sulphide is converted to ferrous chloride.

Any ferric chloride which is produced in the reaction chamber will be vaporized and swept along with the incoming sulphuryl chloride to meet the entering iron sulphide-bearing material. The ferric chloride will react with the heavy metal sulphides to form ferrous chloride and sulphur chloride. Sulphur chloride which is formed will also react with the heavy metal sulphides. The reaction between the sulphides and the sulphuryl chloride is exothermic and the desired temperatures may be maintained by the heat developed.

The sulphur produced is vaporized and separated from the heavy metal chlorides in the hottest portion of the reaction chamber, and the residue containing the heavy metal chlorides is discharged from the reaction chamber preferably at a temperature of about 300° C.

The gases issuing from the reaction chamber are cooled to condense the sulphur and thus separate the sulphur and sulphur dioxide. The sulphur dioxide is collected and combined with chlorine recovered from the ferrous chloride produced to regenerate sulphuryl chloride.

The hot residue containing ferrous chloride is subjected to the action of chlorine gas to produce and vaporize ferric chloride. The treatment of the ferrous chloride-bearing material is preferably conducted in a rotary reaction chamber which is so constructed and arranged that ferrous chloride-bearing material charged into one end portion will move progressively toward the other end portion during its rotation. The ferrous chloride-bearing material and the chlorine gas are preferably introduced into opposite ends of the reaction chamber and pass through the reaction chamber in counter-current relationship. The ferrous chloride-bearing material thus passes gradually into regions of increasing chlorine concentrations and a substantially complete removal of iron from the mass is assured.

The hot residue contains nickel chloride and copper chloride in addition to ferrous chloride and gangue, and it enters the reaction chamber at a temperature of about 300° C. The chlorine employed for treating the ferrous chloride-bearing material comprises, in part at least, chlorine which is recovered in a subsequent step of the process from ferric chloride produced during the course of the treatment, and it is contaminated with inert gases which are introduced into the system. The inert gases may be utilized for sweeping the ferric chloride from the reaction chamber, and the reaction chamber may, therefore, be maintained at a temperature below the boiling point of ferric chloride. Satisfactory results may be obtained if the reaction chamber is maintained at a temperature of about 300° C., but temperatures above 300° C. and preferably above 315° C., the boiling point of ferric chloride, are more desirable, a temperature of about 350° C. being very satisfactory.

A reaction between ferrous chloride and chlorine proceeds according to the following equation:

$$2FeCl_2 + Cl_2 = 2FeCl_3$$

The chlorides of nickel and copper remain unchanged and do not vaporize to any substantial extent when a temperature between about 300° C. and 350° C. is maintained.

A residue containing the chlorides of copper and nickel and the gangue contained in the original ore is discharged from the reaction chamber and it may be treated in any desired manner to separate and recover the valuable components.

The vaporized ferric chloride is collected and condensed to eliminate inert gases. The condensed ferric chloride is vaporized and subjected to the action of water vapor at an elevated temperature in a suitable reaction chamber. The ferric chloride is hydrolyzed and ferric oxide and hydrogen chloride are formed, the reaction proceeding according to the following equation:

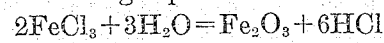

$$2FeCl_3 + 3H_2O = Fe_2O_3 + 6HCl$$

In carrying out the hydrolysis of ferric chloride, ferric chloride vapor and superheated steam are introduced together into the reaction chamber in such a manner that intimate mixing will result. The reaction may be conducted conveniently at a temperature of about 300° C. to 400° C. Good results may be obtained if the reaction chamber is maintained at a temperature of about 350° C.

The ferric oxide will be produced in the form of a fine powder which may be permitted to settle out in the reaction chamber. The gases issuing from the chamber contain hydrogen chloride and water vapor and they are passed through a suitable drying apparatus such, for example, as a packed tower having sulphuric acid trickling therethrough to separate the water vapor and produce dry hydrogen chloride.

The dry hydrogen chloride is introduced into a catalytic reaction chamber with one to seven times its volume of air, depending on the concentration of the hydrogen chloride available. The air is preheated to a temperature above 420° C. and preferably to a temperature between 520° C. and 530° C. If desired, the hydrogen chloride may also be preheated.

The catalytic reaction chamber preferably consists of a tower, or a series of communicating towers, packed with porous material having a very large surface per unit of volume such, for example, as pumice, brick, cinders and the like. The packing material should be of such a nature that it will be inert to the reagents and the products of the reaction. The packing material is covered or impregnated with the catalyst which promotes a reaction between hydrogen chloride and oxygen, and which may consist of one or more chlorides or sulphates of metals such, for example, as copper and nickel. The salts may be applied as such directly to the packing material or they may be formed in place as, for example, by the action of hydrogen chloride on copper oxide which is distributed throughout the mass. Means are provided for renewing the catalytic mass as its efficiency becomes reduced. For this purpose two towers, or two series of communicating towers, which may be used alternately are preferably provided.

The apparatus is so constructed that the mass of catalyst bearing material may be maintained at a temperature of from 370 to 400° C. The reaction between the hydrogen chloride and the oxygen of the air is exothermic and it may be so controlled as to permit the proper temperature to be maintained. The reaction will proceed at a temperature as low as 205° C., and a temperature as high as 470° C. may be used advantageously. The temperature at which the reaction is conducted will be governed largely by the nature of the catalyst. The temperature employed should be sufficiently low that excessive volatilization of the catalyst is avoided. The reaction involved in this operation does not proceed to completion. The gases issuing from the reaction chamber will consist of a mixture of hydrogen chloride, water vapor and chlorine.

In view of the fact that the reaction does not readily proceed to completion, it may be desirable to retreat the issuing gases by subjecting them to a drying operation to remove the water vapor and subsequently passing them through a second reaction chamber. This procedure may be repeated two or three or more times if desired. In carrying out the reaction between hydrogen chloride and the oxygen of air it is advisable to carefully control the proportions of air and hydrogen chloride utilized in order to avoid excessive dilution of the resulting chlorine gas and in order to avoid the incorporation of excessive amounts of free oxygen in the resulting chlorine gas.

The gases are washed with water to separate the chlorine and hydrogen chloride. The separated chlorine is dried with sulphuric acid and a portion of the dried gas is combined with the sulphur dioxide produced to regenerate sulphuryl chloride. The remainder of the chlorine is utilized for treating the residue containing ferrous chloride.

The sulphuric acid used for drying the hydrogen chloride and chlorine is combined with the water used for separating the hydrogen chloride and chlorine and the resulting liquid is heated to recover hydrogen chloride which is returned to the process. The sulphuric acid which has been freed from hydrogen chloride is concentrated and again used for drying purposes. A portion of the steam produced in concentrating the sulphuric acid is utilized for treating the ferric chloride. The first fractions obtained during the concentration of the sulphuric acid will contain hydrogen chloride, and the use of these fractions in providing superheated steam for treating the ferric chloride will permit an added recovery of chlorine.

The reaction between the sulphur dioxide and the dry chlorine is preferably conducted at or below normal atmospheric temperatures in the presence of a suitable catalyst such, for example, as activated charcoal. The regenerated sulphuryl chloride may thus be obtained in the form of a liquid. The regenerated sulphuryl chloride is returned to the process for the treatment of additional ore.

As a result of the treatment of the hydrogen chloride with air, considerable quantities of inert gases such as nitrogen are introduced into the system and must be eliminated to avoid excessive dilution. The inert gases introduced into the system will be mixed with the chlorine gas which is recovered and which is utilized for treating the ferrous chloride and combined with the sulphur dioxide produced to regenerate sulphuryl chloride. These gases will be eliminated as a result of the condensation of the ferric chloride produced and the production of liquid sulphuryl chloride. The inert gases issuing from the sulphuryl chloride regenerating chamber may be passed through a suitable separator to recover entrained particles or globules of sulphuryl chloride.

The process may be conducted continuously. A fresh source of chlorine, in the free state or combined in the form of hydrogen chloride or sulphuryl chloride, may be provided to compensate for chlorine losses due to leakage and the production of nickel and copper chlorides. In the event that a source of chlorine or hydrogen chloride is provided, an additional source of sulphur dioxide must be provided.

The principal reactions involved in the process are exothermic and enough heat is provided that no heat need be supplied from outside sources. Heat generated during the course of the process may be utilized for carrying out the concentration of the sulphuric acid vaporization of ferric chloride and other operations in which temperatures must be increased.

We claim:

1. The method of recovering sulphur from material containing iron sulphide which comprises, subjecting said material to the action of sulphuryl chloride to chlorinate the material and displace the sulphur from the sulphide in the presence of sulphur dioxide, separating the sulphur from the sulphur dioxide, and returning the sulphur dioxide to the process.

2. The method of recovering sulphur from material containing iron sulphide which comprises, subjecting the material to the action of sulphuryl chloride at such temperature as to form solid ferrous chloride and elemental sulphur vapor together with sulphur dioxide, separating the sulphur from the sulphur dioxide, recovering chlorine from the ferrous chloride, reacting said chlorine with said sulphur dioxide to re-form sulphuryl chloride and condensing the sulphuryl chloride so formed from the accompanying gases, and returning the sulphuryl chloride to the process.

In testimony whereof we affix our signatures.

RAYMOND F. BACON.
ISAAC BENCOWITZ.